United States Patent [19]

Baugh et al.

[11] 3,866,030

[45] Feb. 11, 1975

[54] TWO'S COMPLEMENT PARALLEL ARRAY MULTIPLIER

[75] Inventors: Charles Richmond Baugh, Lincroft; Bruce Allen Wooley, Colts Neck, both of N.J.

[73] Assignee: Bell Telephone Laboratories, Incorporated, Murray Hill, N.J.

[22] Filed: Apr. 1, 1974

[21] Appl. No.: 457,079

[52] U.S. Cl. .......... 235/164
[51] Int. Cl. .......... G06f 7/39
[58] Field of Search .......... 235/164

[56] References Cited

OTHER PUBLICATIONS

Baugh, C. R. et al., A Two's Complement Parallel Array Multiplication Algorithm, in IEEE Trans. Comp. C-22(12): p. 1045–1047, Dec. 1973.

*Primary Examiner*—Malcolm A. Morrison
*Assistant Examiner*—R. Stephen Dildine, Jr.
*Attorney, Agent, or Firm*—W. Ryan

[57] ABSTRACT

Apparatus and methods for performing the parallel *m*-bit by *n*-bit multiplication of two binary 2's complement numbers by converting the multiplication process to an equivalent parallel array addition in which the operands are positive partial products including (1) terms formed by ANDing a multiplier bit (or its complement), and (2) a multiplicand bit (or its complement) and five additional partial product terms. The resulting simplifications permit circuit realization in the form of an array of 3-bit adders each formed from a combination of threshold logic modules.

14 Claims, 12 Drawing Figures

TWO'S COMPLEMENT PARALLEL ARRAY MULTIPLIER

BACKGROUND OF THE INVENTION

1. Field of the Invention

This invention relates to apparatus and methods for forming the product of digital signals. More specifically, the present invention relates to apparatus and methods for multiplying 2's complement binary numbers.

2. Description of the Prior Art

The use of digital circuits, and in particular, digital computers in recent years has given rise to much research into efficient means for performing specialized arithmetic functions, such as efficient high speed multipliers sfor multiplying signals in various formats. U.S. Pat. No. 3,670,956 issued June 20, 1972 to D. F. Calhoun illustrates one so-called array multiplier system for performing parallel multiplication of operands.

Many of the arithmetic circuits widely used in the digital arts are designed for use with 2's complement binary signals. While such signals and the associated circuits are particularly well adapted for performing efficiently under many circumstances, multiplication using such 2's complement numbers often requires the use of specialized circuits for correcting errors or characteristically incomplete results. See, for example, R. K. Richards, *Arithmetic Operations in Digital Computers,* D. Van Nostrand Company, Inc., 1955, and I. Flores, *The Logic of Computer Arithmetic,* Prentice-Hall, Inc., 1963. U.S. patent application Ser. No. 296,562 filed Oct. 11, 1972 by J. B. Clary illustrates a correction circuit for serial-parallel multiplication circuits.

It is therefore an object of the present invention to avoid the need for special purpose circuitry to correct or modify incomplete results in 2's complement multiplication with negative operands.

It is well known that in many contexts circuit reliability and cost are directly related to the number of different components or modules required, as well as the number of interconnecting paths between such modules.

It is therefore a further object of the present invention to provide a multiplication circuit having a reduced number of fundamental components and interconnecting paths.

The cost of production and maintenance of many complex systems is often increased by the need for a great variety of individual components or building blocks.

It is therefore a further object of the present invention to provide a multiplication circuit having a reduced number of fundamental building blocks.

Threshold logic circuits have long been known in the electronic arts, but have been used to only a relatively small extent because of somewhat greater complexity at the fundamental module level. Recent advances in large scale integrated transistor circuits have, however, suggested the possible application of threshold logic circuits for realizing, among other things, special purpose arithmetic circuits such as multipliers. For example, U.S. Pat. No. 3,524,977, issued Aug. 18, 1970 to M. C. Wang describes a threshold logic adder-based binary multiplier. The Wang circuit, however, requires a considerable variety of different logic modules and is not appropriate for 2's complement arithmetic involving negative operands.

It is therefore a further object of the present invention to provide a multiplication method and system which avoids the need for special post-multiplication correction of results while requiring a small number of different modules, typically of the threshold logic variety, for efficient realization.

SUMMARY OF THE INVENTION

By deriving the complements of each of the input multiplier and multiplicand bits, and by grouping the partial products of a multiplication process in a particular manner, it is possible to eliminate the need for the generation of any negative partial products. In particular, by first suitably ANDing pairs of operand bits (or their complements) in a prescribed manner to derive the individual partial products, and then adding a reordered (slightly augmented) collection of partial products, it provides possible to form a final product using only AND and ADD functional circuit elements. Further, there is no need to provide corrections when negative operands are involved.

In a preferred embodiment a simple class of threshold logic circuits are used in an array organization to realize a circuit implementation of the current inventive multiplication system and process. The fundamental building block is advantageously chosen to be a 3-bit threshold logic adder which may include an AND function.

DETAILED DESCRIPTION

Figure 1:
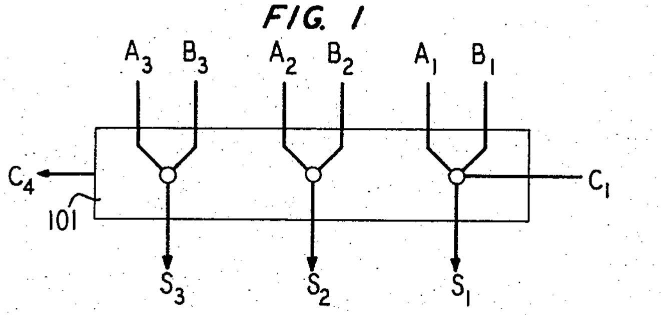
FIG. 1 shows a typical 3-bit adder useful in realizing a circuit implementation of a multiplier in accordance with the present invention.

In binary multiplication an n+m-bit product $\vec{P} = (p_{n+m-1}, p_{n+m-2}, \ldots, p_0)$ is formed by multiplying the m-bit multiplicand $\vec{Y} = (y_{m-1}, y_{m-2}, \ldots, y_0$. by the n-bit multiplier $\vec{X} = (x_{n-1}, \ldots, x_0)$. This multiplication is usually depicted as shown in Example 1. The AND of each multiplier bit and each multiplicant bit is formed to produce the partial product bits. The partial products are then summed to form the product.

The difficulty in two's complement multiplication lies with the signs of the multiplicand and the multiplier. Let $Y_v$ be the value of the multiplicand $\vec{Y}$, and $X_v$ the value of the multiplier $\vec{X}$. For two's complement representation $X_v$ and $Y_v$ are given by $$Y_v = -y_{m-1}2^{m-1} + \sum_{i=0}^{m-2} y_i 2^i \qquad (1a)$$

$$X_v = -x_{n-1}2^{n-1} + \sum_{i=0}^{n-2} x_i 2^i \; . \qquad (1b)$$

The value $P_v$ of the product $\vec{P}$ is $$P_v = -p_{m+n-1}2^{m+n-1} + \sum_{i=0}^{m+n-2} p_i 2^i = Y_v X_v$$

$$= \left[-y_{m-1}2^{m-1} + \sum_{i=0}^{m-2} y_i 2^i\right]\left[-x_{n-1}2^{n-1} + \sum_{i=0}^{n-2} x_i 2^i\right]$$

$$= \left[x_{n-1}y_{m-1}2^{m+n-2} + \sum_{i=0}^{n-2}\sum_{j=0}^{m-2} x_i y_j 2^{i+j}\right] \qquad (2)$$

$$- \left[\sum_{i=0}^{m-2} x_{n-1}y_i 2^{n-1+i} + \sum_{i=0}^{n-2} y_{m-1}x_i 2^{m-1+i}\right] \; .$$

When forming $\vec{P}$ by adding the partial products, the sign of the partial product bits must be considered. In particular, the signs of $x_{n-1}y_i$ for $i = 0, \ldots, m-2$ and $y_{m-1}x_i$ for $i = 0, \ldots, n-2$ are negative. By rewriting the partial product bits as shown in Example 2, all the partial product bits with negative signs are placed in the last two rows. The product is formed by adding the first $n-2$ partial product rows and subtracting the last two rows.

Instead of subtracting the partial products that have

| | | | | | | | | | | | |
|---|---|---|---|---|---|---|---|---|---|---|---|
| | | | $y_{m-1}$ | | $\cdots$ | | $y_4$ | $y_3$ | $y_2$ | $y_1$ | $y_0$ |
| | | | | | | $x_{n-1}$ | | $\cdots$ | $x_2$ | $x_1$ | $x_0$ |
| | | | $x_0y_{m-1}$ | | $\cdots$ | | $x_0y_4$ | $x_0y_3$ | $x_0y_2$ | $x_0y_1$ | $x_0y_0$ |
| | | $x_1y_{m-1}$ | $x_1y_{m-2}$ | $\cdots$ | | $x_1y_4$ | $x_1y_3$ | $x_1y_2$ | $x_1y_1$ | $x_1y_0$ | |
| | $x_2y_{m-1}$ | $x_2y_{m-2}$ | | $\cdots$ | $x_2y_4$ | $x_2y_3$ | $x_2y_2$ | $x_2y_1$ | $x_2y_0$ | | |
| | $\vdots$ | | | | | $\vdots$ | | | | | |
| | | | $\cdots$ | | $x_{n-2}y_2$ | $x_{n-2}y_1$ | $x_{n-2}y_0$ | | | | |
| | $x_{n-1}y_{m-1}$ | | $\cdots$ | $x_{n-1}y_2$ | $x_{n-1}y_1$ | $x_{n-1}y_0$ | | | | | |
| $p_{m+n-1}$ | $p_{m+n-2}$ $\cdots$ $p_{m+1}$ | $p_m$ | $p_{m-1}$ $\cdots$ $p_{n+1}$ | $p_n$ | $p_{n-1}$ | $p_{n-2}$ $\cdots$ $p_3$ | $p_2$ | $p_1$ | $p_0$ | | |

EXAMPLE 1 negative signs, the negation of the partial products can be added. The value of the negation of a two's complement number $\vec{Z} = (z_{k-1}, \ldots, z_0)$ with value $Z_v$ is $$-Z_v = 1 - \bar{z}_{k-1}2^{k-1} + \sum_{i=0}^{k-2} \bar{z}_i 2^i \qquad (3)$$

where $\bar{z}_i$ is the complement of $z_i$. Therefore, the subtraction of $$2^{n-1}\left[-0\cdot 2^m + 0\cdot 2^{m-1} + \sum_{i=0}^{m-2} x_{n-1}y_i 2^i\right], \qquad (4)$$

can be replaced with the addition of $$2^{n-1}\left[-1\cdot 2^m + 1\cdot 2^{m-1} + 1 + \sum_{i=0}^{m-2} \overline{x_{n-1}y_i}\,2^i\right]. \qquad (5)$$

Thus the partial product row of Example 2 containing $0 \quad 0 \quad x_{n-1}y_{m-2}\ x_{n-1}y_{m-3} \ldots x_{n-1}y_0$ is replaced by $1 \quad 1 \quad \overline{x_{n-1}y_{m-2}}\ \overline{x_{n-1}y_{m-3}} \ldots \overline{x_{n-1}y_0},$ with a "1" added to the $p_{n-1}$ column. Similarly, the row containing $0 \quad 0 \quad x_{n-2}y_{m-1}\ x_{n-3}y_{m-1} \ldots x_0y_{m-1}$ is replaced by $1 \quad 1 \quad \overline{x_{n-2}y_{m-1}}\ \overline{x_{n-3}y_{m-1}} \ldots \overline{x_0y_{m-1}}$ with a 1 added in the $p_{m-1}$ column. Following these substitutions, all partial product bits can be treated in exactly the same manner with respect to the sign.

The substitution of (5) for (4) in Example 2 results in nonuniformity with regard to partial product bits since some partial product bits are the NAND of a multiplier bit and multiplicand bit, while others are formed with an AND. To simplify this situation, the following equivalences are used. Note that (5) has the value $$
\begin{array}{cccccccccccc}
 & & & y_{m-1} & \cdots & & y_4 & y_3 & y_2 & y_1 & y_0 \\
 & & & & & x_{n-1} & \cdots & & x_2 & x_1 & x_0 \\
\hline
 & & & & x_0y_{m-2} & \cdots & x_0y_4 & x_0y_3 & x_0y_2 & x_0y_1 & x_0y_0 \\
 & & & x_1y_{m-2} & \cdots & x_1y_4 & x_1y_3 & x_1y_2 & x_1y_1 & x_1y_0 & \\
 & & x_2y_{m-2} & \cdots & x_2y_4 & x_2y_3 & x_2y_2 & x_2y_1 & x_2y_0 & & \\
 & & \cdot & & & & & \cdot & & & \\
x_{n-1}y_{m-1} & 0 & x_{n-2}y_{m-2} & \cdots & x_{n-2}y_4 & x_{n-2}y_3 & x_{n-2}y_2 & x_{n-2}y_1 & x_{n-2}y_0 & & \\
0 & 0 & x_{n-1}y_{m-2} & x_{n-1}y_{m-3} \cdots & x_{n-1}y_4 & x_{n-1}y_3 & x_{n-1}y_2 & x_{n-1}y_1 & x_{n-1}y_0 & & \\
0 & 0 & x_{n-2}y_{m-1} & x_{n-3}y_{m-1} \cdots x_0y_{m-1} & & & & & & & \\
\hline
p_{n+m-1} & p_{n+m-2} & p_{n+m-3} & p_{n+m-4}\cdots p_{m-1}\cdots p_{n+3} & p_{n+2} & p_{n+1} & p_n & p_{n-1} & p_{n-2}\cdots p_3 & p_2 & p_1 \quad p_0
\end{array}
$$

EXAMPLE 2

$$
\begin{cases}
0 & \text{for } x_{n-1} = 0 \\
2^{n-1}\left[-2^m + 2^{m-1} + 1 + \sum_{i=0}^{m-2} \bar{y}_i 2^i\right] & \text{for } x_{n-1} = 1.
\end{cases} \qquad (6)
$$

From (6) it follows that (5) can be rewritten as $$2^{n-1}\left[-2^{m}+2^{m-1}+\bar{x}_{n-1}2^{m-1}+x_{n-1}+\sum_{i=0}^{m-2}x_{n-1}\bar{y}_{i}2^{i}\right]. \qquad (7)$$

Therefore, (5) is equivalent to (7). Since the next to last row of partial product bits in Example 2 is of the form given in (5), (7) is substituted for this row. By making a similar substitution for the last row of partial product bits and by adding constants, the partial product bits of Example 3 are obtained.

The principal characteristic of the partial product bits in Example 3 is uniformity. The two advantages of this uniformity are:

1. The partial product bits are obtained by forming the AND of a multiplier bit and a multiplicand bit.
2. Every partial product bit has a positive coefficient.

| | | | | | | | | | | | | | | | |
|---|---|---|---|---|---|---|---|---|---|---|---|---|---|---|---|
| | | | | | $y_{m-1}$ | • | • | • | $y_4$ | $y_3$ | $y_2$ | $y_1$ | $y_0$ | | |
| | | | | | | | | $x_{n-1}$ | • | • | • | $x_2$ | $x_1$ | $x_0$ | |
| | | | | | | $x_0y_{m-2}$ | | • | • | • | $x_0y_2$ | $x_0y_1$ | $x_0y_0$ | | |
| | | | | | $x_1y_{m-2}$ | | • | • | • | $x_1y_2$ | $x_1y_1$ | $x_1y_0$ | | | |
| | | | | $x_2y_{m-2}$ | | • | • | • | $x_2y_1$ | $x_2y_0$ | | | | | |
| $x_{n-1}y_{m-1}$ | 0 | $x_{n-2}y_{m-2}$ | • | • | • | • | $x_{n-2}y_2$ | $x_{n-2}y_1$ | $x_{n-2}y_0$ | | | | | | |
| $\bar{x}_{n-1}$ | $x_{n-1}\bar{y}_{m-2}$ | $x_{n-1}\bar{y}_{m-3}$ | • | • | $x_{n-1}\bar{y}_2$ | $x_{n-1}\bar{y}_1$ | $x_{n-1}\bar{y}_0$ | | | | | | | | |
| $\bar{y}_{m-1}$ | $\bar{x}_{n-2}y_{m-1}$ | $\bar{x}_{n-3}y_{m-1}$ | • • • | $\bar{x}_0y_{m-1}$ | | | | | | | | | | | |
| 1 | | | | $y_{m-1}$ | | $x_{n-1}$ | | | | | | | | | |
| $p_{n+m-1}$ | $p_{n+m-2}$ | $p_{n+m-3}$ | $p_{n+m-4}$ | • • • | $p_{m-1}$ | • • • | $p_{n+1}$ | $p_n$ | $p_{n-1}$ | $p_{n-2}$ • • • $p_3$ | $p_2$ | $p_1$ | $p_0$ | | |

EXAMPLE 3

Therefore the product is formed with only the AND function and the ADD function. No subtraction is necessary, nor is the NAND function needed to form $\overline{x_iy_j}$. An example of a 4 × 8-bit multiplication using this algorithm is shown in Example 4.

EXAMPLE 4

| | | | | | | | | | | | | |
|---|---|---|---|---|---|---|---|---|---|---|---|---|
| | | | | 0 | 1 | 1 | 0 | 1 | 1 | 0 | 1 | 109 |
| | | | | | | | | 1 | 1 | 1 | 0 | −2 |
| | | | | | 0 | 0 | 0 | 0 | 0 | 0 | 0 | |
| | | | | 1 | 1 | 0 | 1 | 1 | 0 | 1 | | |
| | 0 | | 1 | 1 | 0 | 1 | 1 | 0 | 1 | | | |
| | 0 | 0 | 0 | 1 | 0 | 0 | 1 | 0 | | | | |
| | 1 | 0 | 0 | 0 | | | | | | | | |
| 1 | | | | 0 | | | | 1 | | | | |
| 1 | 1 | 1 | 1 | 0 | 0 | 1 | 0 | 0 | 1 | 1 | 0 | −218 |

It will be noted that the multiplication shown in Example 4 includes as summed terms partial products involving complemented input bits, e.g., $\bar{y}_0$ in the partial product $x_{n-2}\bar{y}_0$, which is used in place of the more typical $x_{n-2}y_0$ partial product. This represents only a slight difficulty, however, because many functional logic circuits likely to be used in constructing practical multipliers, such as standard current-mode logic circuits, make available both a variable and its complement with little or no additional complexity. The arrangement derived above and illustrated in Example 3 also requires the derivation of additional degenerate partial products, viz., $x_{n-1}$, $\bar{x}_{n-1}$, $y_{m-1}$, $\bar{y}_{m-1}$, and 1. These functions and the AND circuits required for forming the partial products are, however, readily incorporated in the addition circuits. See, for example, S. D. Pezaris, "A 40-ns 17-bit by 17-bit array multiplier," *IEEE Trans. on Computers*, Vol. C-20, pp. 442–447, April 1971; and D. Hampel, et al., "Development of high-speed integrated circuits, digital multipliers and sample and hold gates; Final Report," U.S. Air Force Avionics Laboratory, Contract AFAL-TR-71395, March 1972 for examples involving AND gates in the manner mentioned above.

As will be clear to those skilled in the data processing arts, the above-described reformulation of traditional multiplication processes can be implemented in any number of particular special purpose or programmed apparatus embodiments. A particular typical embodiment based on threshold logic circuit building blocks will be described below. Other particular structures based on the more widely used AND and OR gate building blocks are, of course, possible and even desirable in some instances.

The basic module to be used in the illustrative embodiment of the present invention is shown in FIG. 1 as 3-bit adder 101. As can be seen, inputs to the adder module 101 include ordered pairs of input signals from the modular operands $A = A_1A_2A_3$ and $B = B_1B_2B_3$. The remaining input $C_1$ is a carry input from a connected module. The module outputs include 3 ordered sum outputs $S_1$, $S_2$, $S_3$ and a carry output $C_4$, corresponding to the sum and carry bits for A, B and $C_1$. That is module 101 is characterized by the summation $$\begin{array}{r} C_1 \\ A_3\,A_2\,A_1 \\ \underline{B_3\,B_2\,B_1} \\ C_4\,S_3\,S_2\,S_1 \end{array}$$

Figure 2:
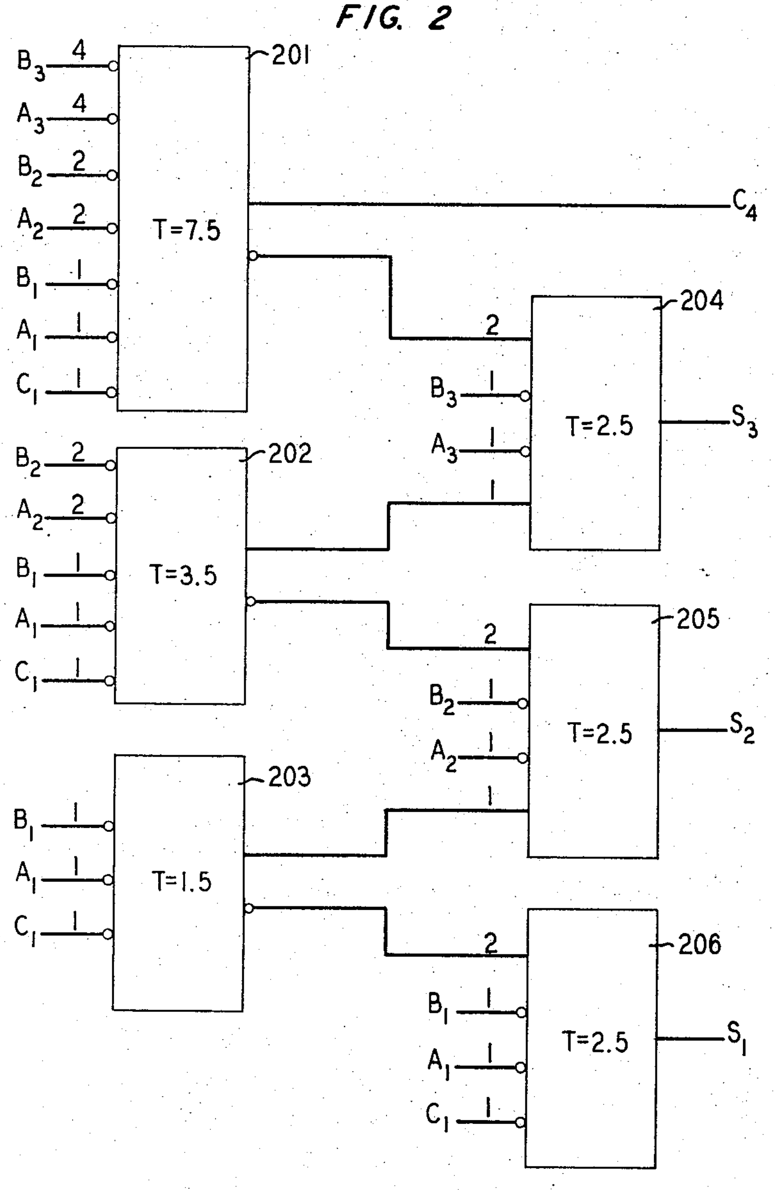
FIG. 2 shows a combination of threshold logic circuits useful for realizing the 3-bit adder of FIG. 1.

FIG. 2 illustrates a typical realization of the adder 101 of FIG. 1 in terms of a plurality of threshold logic circuits 201–206. While the particular structure for each of the threshold logic circuits 201–206 form no essential part of the present disclosure, nevertheless a brief characterization of threshold logic functions and circuits will prove useful.

A Boolean function $f(\vec{X})$ of $N$ variables, $\vec{X} = (x_1, \ldots, x_N)$, is a threshold function if there exist an integer $T'$ and a vector of integers $\vec{W} = (w_1, \ldots, w_N)$ such that $$f(\vec{X}) = \begin{cases} 1 & \text{if } \vec{W}\cdot\vec{X} = \sum_{i=1}^{N} w_i x_i > T' - 0.5 \triangleq T \\ 0 & \text{if } \vec{W}\cdot\vec{X} < T \end{cases} \qquad (8)$$

The weights $w_i$ and threshold $T$ are called structure of $f(\vec{X})$, denoted $[\vec{W};T]$. From this definition it is obvious that many conventional gates are special cases of threshold functions. For example, a structure for a 3-input AND gate is [1,1,1;2.5], and a structure for a 4-input NOR gate is [−1,−1,−1;−.5]. These are very simple threshold functions.

Many threshold functions are considerably more complex than conventional gates. One such function, which forms the carry when adding a carry, $c_0$, and two 3-bit numbers, $a_2a_1a_0$ and $b_2b_1b_0$, is $$f_c = a_2b_2 \; V \; (a_2Vb_2)a_1b_1 \; V \; (a_2Vb_2)(a_1Vb_1) \; (a_0b_0Va_0c_0Vb_0c_0), \qquad (9)$$

where $V$ indicates logical OR. This 7-input threshold function has a structure [1,1,1,2,2,4,4;7.5]. The logic diagram representation of this function is, of course, shown in FIG. 2 as 201.

Useful tutorial sources on the subject of threshold logic functions and circuits are S. Mugora, *Threshold Logic and Its Application*, Wiley, New York, 1971; and D. Hampel and R. O. Winder, "Threshold Logic," *IEEE Spectrum*, Vol. 8, pp. 32–39, May 1971. Particular circuits useful in realizing threshold functions in related contexts are described in U.S. Pat. Nos. 3,524,977 issued Aug. 18, 1970 to M. C. Wang, and 3,725,687 issued Apr. 3, 1973 to J. D. Heightley. The Wang and Heightley patents are hereby incorporated by reference.

It should be clear that, in general, a single threshold logic circuit is capable of implementing a more complicated logic function than simple gate circuits, thereby reducing the total number of fundamental logic modules and the attendant interconnections. D. Hampel, J. H. Beinart and K. J. Prost, in "Threshold Logic Implementation of a Modular Computer System Design," *NASA Report CR-1668*, October 1970, indicate that a threshold logic realization of typical systems give rise to a logic module reduction of 3:1 or greater as compared to NAND-gate circuitry. Interconnections between modules are correspondingly reduced by as much as 5:1.

Returning to FIG. 2, it should be noted that the carry output $C_4$ is generated entirely by the single module 201, while each of the sum outputs $s_1$, $s_2$ and $s_3$ are generated only after processing by exactly two modules. It should not be surprising, therefore, that the propagation delay from the inputs to the carry output is approximately one-half of that for the sum outputs, the latter outputs experiencing approximately the same delay.

As noted above, a typical embodiment of a multiplier in accordance with the present invention assumes the form of an array of the 3-bit adder modules shown in FIGS. 1 and 2. By way of illustration, an array suitable for performing an 8 × 12-bit multiplication will be described. That is, a multiplication example used to illustrate the present invention will be $$\begin{array}{r} y_{11}\,y_{10} \;\cdots\; y_1\,y_0 \\ \underline{x_7 \;\cdots\; x_1\,x_0} \\ p_{19} \;\cdots\;\cdots\; p_1\,p_0 \end{array}$$

Figure 3:
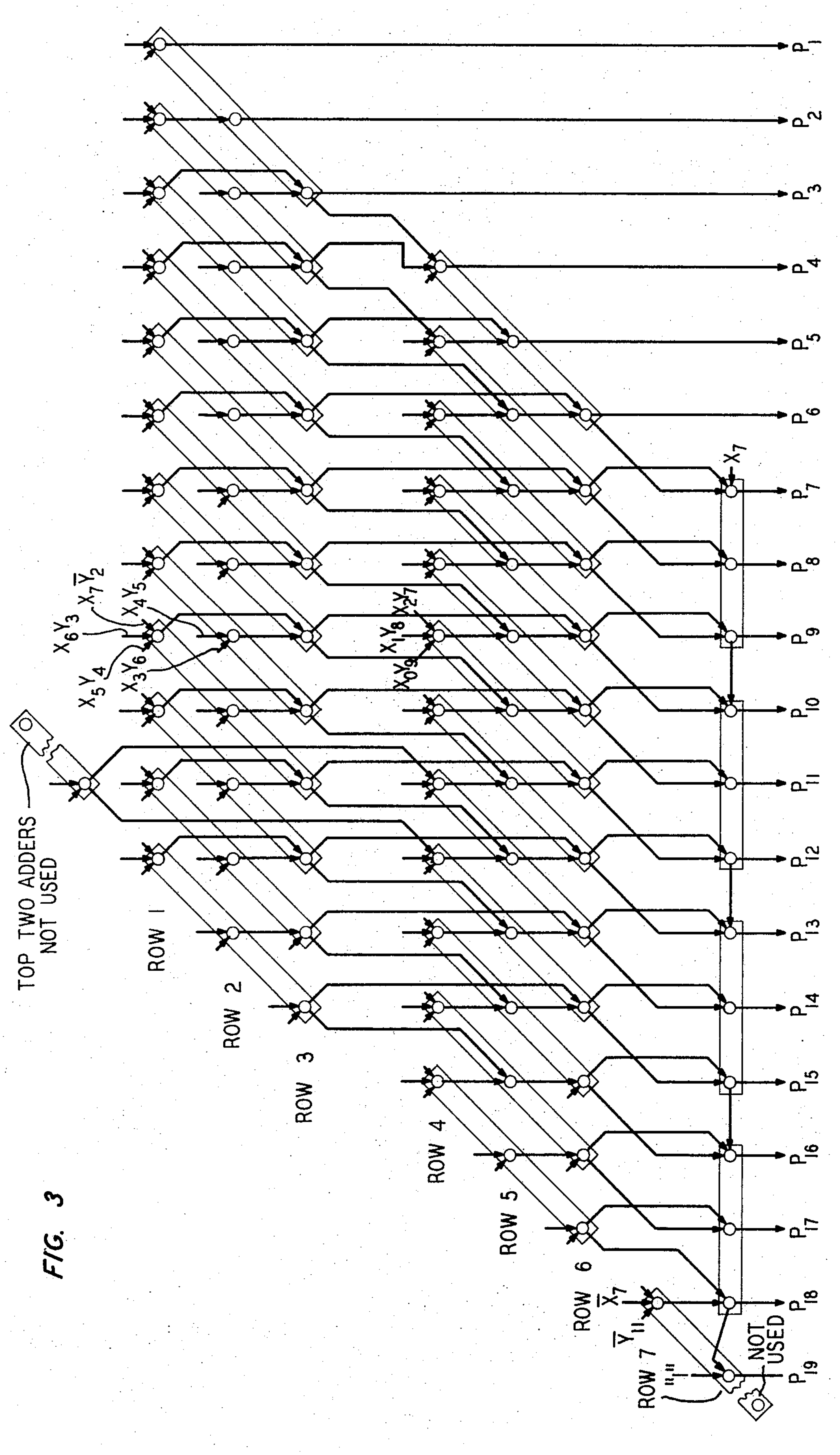
FIG. 3 shows an array of 3-bit adders of the type shown in FIG. 1 for realizing an illustrative 8 × 12-bit multiplication in accordance with the present invention.

The illustrative 8 × 12-bit 2's complement multiplier circuit is shown in FIG. 3 as comprising an array of 3-bit adders of the type described above. For the sake of clarity, the partial product bits have been explicitly shown in FIG. 3 in column $p_9$ only. In each column, however, the partial products are seen to have subscripts which sum to the number defined by the corresponding product bit, e.g., $x_6y_3$ and $x_4y_5$ in the $p_9$ column. The association of particular partial products with particular row and column positions may be made in an arbitrary manner, i.e., the sum may be made in any order.

The application of the five additional partial product bits needed for implementing the multiplication process shown in Examples 3 and 4 and discussed above are also shown in FIG. 3. Three additional 1-bit adders are required for $x_7$, $y_{11}$, $\bar{x}_7$, $\bar{y}_{11}$, and 1. Since only 3-bit adders are advantageously used in the FIG. 3 array two additional 3-bit adders are required for a total of 30 3-bit adders. For comparison, a typical 8 × 12-bit sign-magnitude multiplier requires 28 3-bit adders.

In determining the propagation delay of the 8 × 12-bit multiplier shown in FIG. 3, the following notation is used. The sum propagation delay, $d_s$, of the adder of FIG. 1 is the delay from the inputs to the sum outputs.

Similarly the carry delay, $d_c$, is the delay from the inputs to the carry output. As noted above and based on the independent analysis of standard circuits, it is reasonable to assume that the carry delay is less than the sum delay. It will also be assumed that the carry delay is greater than half the sum delay due to output stage delays on $S_1$, $S_2$, $S_3$ and $C_4$. These assumptions are summarized as $$\tfrac{1}{2} d_s < d_c < d_s \quad (10)$$

To calculate the total propagation delay of the 8 × 12-bit multiplier, rows 1, 2, and 3 of FIG. 3 are considered together. The inputs to the adders in row 3 are delayed by $d_s$ from the adders in rows 1 and 2. This is based on the assumption that the delay from $A_1$, $B_1$, $C_1$ to $S_1$ is the same as the delay from $A_2B_2$ (given $A_1$, $B_1$, $C_1$ already applied) to $S_2$. Since the delay from $A_3$, $B_3$ (given $A_2$, $B_2$, $A_1$, $B_1$, $C_1$ already applied) to $S_3$ is also $d_s$, the sum out of row 3 is obtained with delay $2d_s$. Therefore, product bits $p_1$, $p_2$ and $p_3$ are generated with delays $d_s$, $2d_s$, and $2d_s$ respectively. The carry out of row 3 is obtained within a delay of $d_c + d_s$.

Rows 4, 5 and 6 are treated similarly to rows 1, 2, and 3. For column $p_4$, one input arrives with delay $2d_s$ (sum from row 3 column $p_4$) and another input arrives with delay $d_c + d_s$ (carry from row 3 column $p_3$). For the adder of row 5, column $p_5$, one input arrives with $d_c + 2d_s$ delay (sum from row 4 column $p_5$ with one of its inputs from row 3 column $p_4$) and the other input arrives with $2d_s$ delay (sum from row 3 column $p_5$). For the adder of row 6, column $p_6$, the inputs arrive in delays $d_c + 2d_s$ and $2d_s$. Therefore, $p_4$ is generated in $3d_s$ delay, $p_5$ is generated in $d_c + 3d_s$ delay, and $p_6$ is generated in $d_c + 3d_2$ delay. The carry out of the adder in row 6 column $p_6$ is generated in $2d_c + 2d_s$ delay. The sum and carry delays out of row 6 are, in general, $d_c + 3d_2$ and $2d_c + 2d_s$, respectively.

The remaining portion of the total propagation delay is contributed by the carry ripple through the adders of row 7. The inputs to these adders, except for the carry input, are supplied by the row 6 adder outputs, which have delays of $d_c + 3d_s$ for the sum and $2d_c + 2d_2$ for the carry. Therefore, $p_7$, $p_8$, and $p_9$ have delay $d_c + 4d_2$. Product bits $p_{10}$, $p_{11}$, and $p_{12}$ have delay $2d_c + 4d_2$ because of the carry delay from the row 7 column $p_9$ adder.

When the delays are traced through the array multiplier in this manner the propagation delays shown in Table 1 are obtained. The terms $\alpha/\beta$ denote delays of $\alpha d_c + \beta d_s$. Therefore the total propagation delay for 8 × 12-bit multiplier is $5d_c + 4d_s$. Note that the five additional partial product bits required by the present multiplication process do not increase the total propagation delay.

Figure 4:
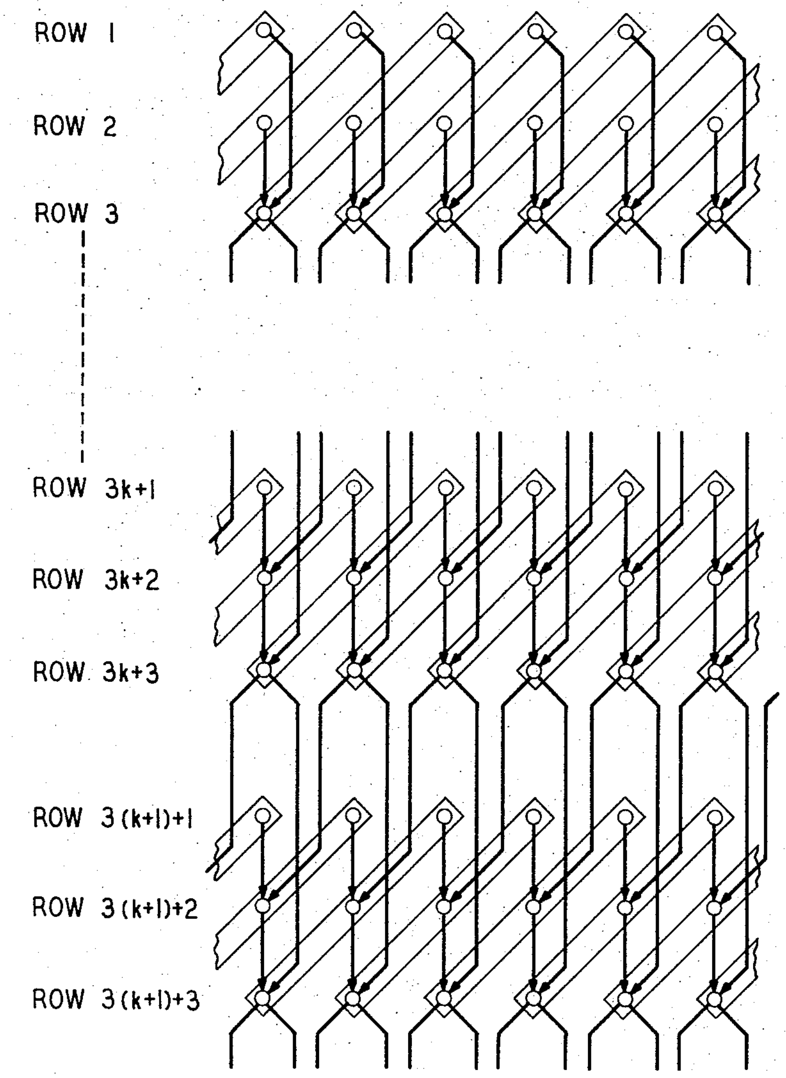
FIG. 4 shows the manner of arranging modules of the type shown in FIG. 1 to realize an arbitrary array multiplier in accordance with the present invention.

The above array of interconnected 3-bit adders can be readily generalized to realize $nxm$-bit multipliers. In order to accommodate an $m$-bit multiplicand, the array is expanded horizontally. The delay, which is a function of $m$, is the carry propagation delay of the bottom row of horizontal adders. This delay is $[m/3]\, d_c$, where, for some number $z$, $[z]$ *is the integer part of* $z$. In order to accommodate an n-bit multiplier the array is expanded vertically. The vertical arrangement of the 3-bit adders is done with modules of three rows, as was shown in FIG. 3. For an $n$-bit multiplier the maximum number of adders needed in a given column is $n - 1$ (not counting the five extra partial product bits). Thus, for the example of FIG. 3 seven adders are used (not counting the adders for $y_{11}$, $\overline{y}_{11}$, $x_7$, $\overline{x}_7$, and 1). Since the last row of adders must be arranged horizontally, $n - 2$ rows of adders are implemented with the three row modules. The number of modules is $[n/3]$. The interconnection patterns for the modules for for an arbitrary mxn multiplier are shown in FIG. 4. The delays for the first three row modules are:

$d_c + d_s$ for each carry delay
$2d_s$ for each delay.

The $k^{th}$ module of three rows has a propagation delay of $d_o + d_2$. If each of one of sum and carry delays into the $k^{th}$ module are $d_s^{k-1}$ and $d_c^{k-1}$, respectively, each carry and sum delays out of the $k^{th}$ module are $$d_s^k = d_s^{k-1} + d_c + d_s$$
$$d_c^k = d_c^{k-1} + d_c + d_s$$

Therefore, the total delay through the complete set of three row modules is $[(n/3) - 1]\,(d_c + d_s) + d_c + d_s$ for each carry $[(n/3$ $^{-}1]\,(d_c + d_s) + 2d_s$ for each sum Consequently the total propagation delay for an $nxm$-bit multiplication is $$[(n/3) - 1]\,(d_c + d_s) + 3d_s + m/3]\, d_c$$

The propagation delay is tabulated for various values in $n$ and $m$ in Table 2.

TABLE 1

| ROW | | COLUMN | | | | | | | | | | | | | | | | | | |
|---|---|---|---|---|---|---|---|---|---|---|---|---|---|---|---|---|---|---|---|---|
| | | 19 | 18 | 17 | 16 | 15 | 14 | 13 | 12 | 11 | 10 | 9 | 8 | 7 | 6 | 5 | 4 | 3 | 2 | 1 |
| 3 | sum | – | – | – | – | – | 0/2 | 0/2 | 0/2 | 0/2 | 0/2 | 0/2 | 0/2 | 0/2 | 0/2 | 0/2 | 0/2 | 0/2 | 0/2 | 0/1 |
| | carry | – | – | – | – | – | 1/0 | 1/1 | 1/1 | 1/1 | 1/1 | 1/1 | 1/1 | 1/1 | 1/1 | 1/1 | 1/1 | 1/1 | 1/1 | 1/1 |
| 6 | sum | – | – | 0/1 | 0/2 | 0/3 | 1/3 | 1/3 | 1/3 | 0/4 | 1/3 | 1/3 | 1/3 | 1/3 | 1/3 | 1/3 | 0/3 | – | – | – |
| | carry | – | – | 1/0 | 1/1 | 1/2 | 2/2 | 2/2 | 2/2 | 1/3 | 2/2 | 2/2 | 2/2 | 2/2 | 2/2 | 2/2 | 2/2 | – | – | – |
| 7 | sum | 5/4 | 4/4 | 4/4 | 4/4 | 3/4 | 3/4 | 3/4 | 2/4 | 2/4 | 2/4 | 1/4 | 1/4 | 1/4 | – | – | – | – | – | – |
| | carry | – | 5/3 | – | – | 4/3 | – | – | 3/3 | – | – | 2/3 | – | – | – | – | – | – | – | – |

TABLE 2

| n/m | 8 | 12 | 16 | 20 | 24 |
|---|---|---|---|---|---|
| 8 | 3/4 | 5/4 | 6/4 | 7/4 | 9/4 |
| 12 | — | 7/6 | 8/6 | 9/6 | 11/6 |
| 16 | — | — | 9/7 | 10/7 | 12/7 |

The number of 3-bit adders necessary for the $nxm$-bit multiplication is easily obtained. Each module of three rows contains $m$ 3-bit adders for a total of $[(n/3)-1]$ $m$ adders. The last row of horizontal adders requires $[(m+2)/3]$ adders. The additional partial product bits $y_{m-1}$, $x_{n-1}$, 1, $\bar{y}_{m-1}$ and $\bar{x}_{n-1}$ require two more 3-bit adders for multipliers consisting of an even number of bits. Therefore, the total number of adders required is $$[(n/3)-1]\,m+2+[(m+2)/3]$$

The number of adders for various $n$ and $m$ are shown in Table 3.

TABLE 3

| n/m | 8 | 12 | 16 | 20 | 24 |
|---|---|---|---|---|---|
| 8 | 21 | 30 | 40 | 51 | 58 |
| 12 | — | 56 | 72 | 89 | 106 |
| 16 | — | — | 88 | 109 | 130 |

While the circuits of FIGS. 3 and 4 give the details for one of many ways of implementing the parallel array addition using the 3-bit threshold logic adder of FIGS. 1 and 2, custom threshold logic designs for specific values of $n$ and $m$ may improve the propagation delay of the multiplication. Further, while the above description of a multiplier has proceeded in terms of threshold logic circuits, no such circuits are fundamental to the basic reformulation of the multiplication process for 2's complement binary numbers. That is, standard (non-threshold logic) adders may be used to perform the additions by column (with intercolumn carries) of the partial product terms as shown in Example 3 and FIGS. 3 and 4.

Similarly, though sources of typical threshold circuits were cited above, others skilled in the arts will choose different particular designs. Also, while a uniform array of 3-bit adders has proven advantageous, other practitioners may choose a combination of adders for processing different numbers of bits, including individual 1-bit adders (with carries).

If a mixture of fundamental subcircuits having different propagation delays are used in realizing the threshold logic modules shown in FIG. 2, it is possible to introduce appropriate fixed delays to achieve a particular ratio of delays within a range including that indicated to be desirable above. To illustrate the possible need for such propagation delay adjustments, an alternative embodiment of the 3-bit adder of FIG. 1 will be discussed.

Figure 5:
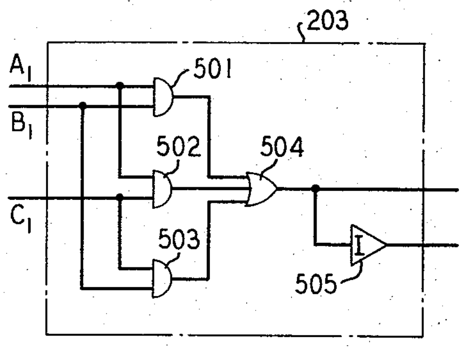
FIG. 5 shows an alternative realization for the logic function 203 in FIG. 2.

Thus, for example, the 3-input threshold logic block 203 in FIG. 2 having weights 1,1,1 and threshold T = 1.5 will be recognized to be realizable as three 2-input AND gates 501, 502 and 503 connected to an OR gate 504 as shown in FIG. 5. An inverter 505 is also introduced to generate the required inverted output. If, then, a circuit having different device characteristics than those of the gates used to realize the circuit 203 of FIG. 5 were used to realize the circuit 201 in FIG. 2, it might prove advantageous to extend the propagation delays for one of the circuits having the proportionately smaller delay, thereby to achieve the proper carry to sum delay ratio as described in Table 1, for example. Such additional propagation delays may be achieved simply by cascading an appropriate number of inverters having known delay in series with the output to be delayed.

Figure 6A:
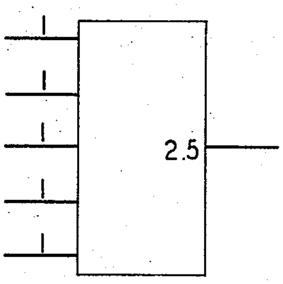
FIG. 6A shows a standard logic circuit useful in realizing some of the logic functions shown in FIG. 2.
Figure 6B:
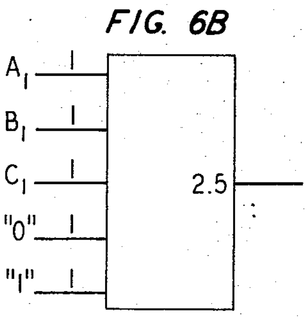
FIG. 6B shows useful modifications to the circuit of FIG. 6A.
Figure 6C:
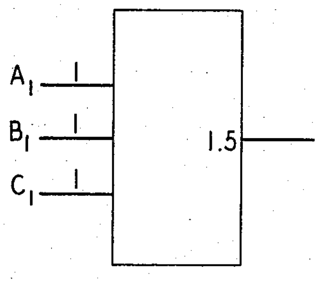
FIG. 6C shows the equivalent circuit resulting from the modifications of FIG. 6B.

The desirability of such delay adjustments may be a result of the availability of a particular threshold logic circuit. For example, a standard threshold logic circuit such as the Motorola type MC-14530 dual 5-input majority logic gate having the weights 1,1,1,1,1 and threshold 2.5 as shown in FIG. 6A may prove convenient in realizing certain of the threshold logic functions indicated in FIG. 2. Thus if 0 and 1 signals are applied to the bottom two inputs of the above-cited Motorola circuit as shown in FIG. 6B, the equivalent of the circuit of FIG. 6C results. But this is precisely the threshold logic circuit 203 in FIG. 2 or FIG. 5. The propagation delay for the circuit 203 when realized as shown in FIGS. 6B and 6C. However, the circuit in FIG. 6C will, in general, be different from that realized using standard gate circuits as shown in FIG. 5.

Figure 6D:
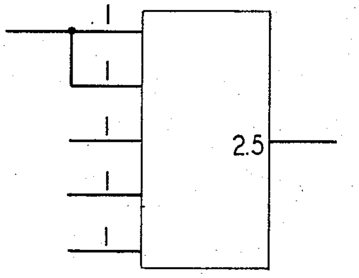
FIG. 6D shows other useful modifications to the circuit of FIG. 6A.
Figure 6E:
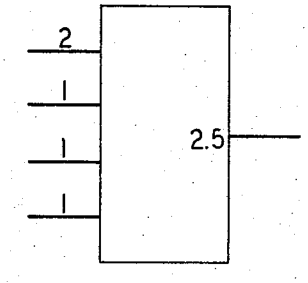
FIG. 6E shows the equivalent circuit resulting from the modifications of FIG. 6D.

It should also be noted that the threshold logic circuits 204–206 in FIG. 2 can also be realized by slight modification to the above-cited Motorola circuit. Thus by connecting together the top two inputs as shown in FIG. 6D, the circuit of FIG. 6E results.

Figure 7:
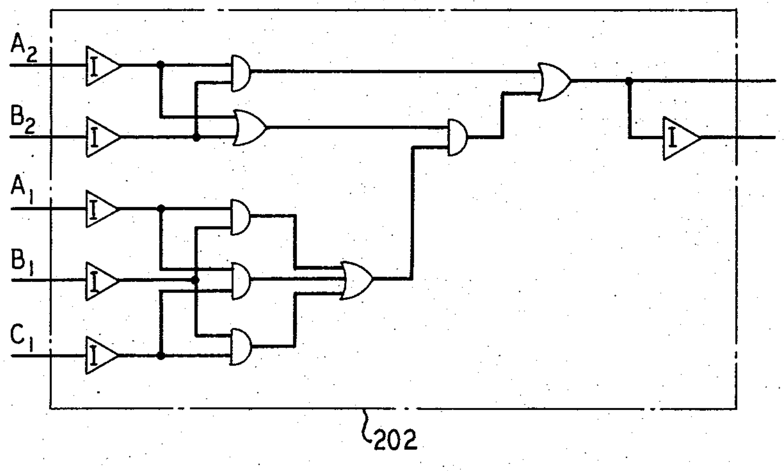
FIGS. 7 and 8 show alternative logic circuit realizations for achieving the functions of circuits 202 and 201, respectively, in FIG. 2.
Figure 8:
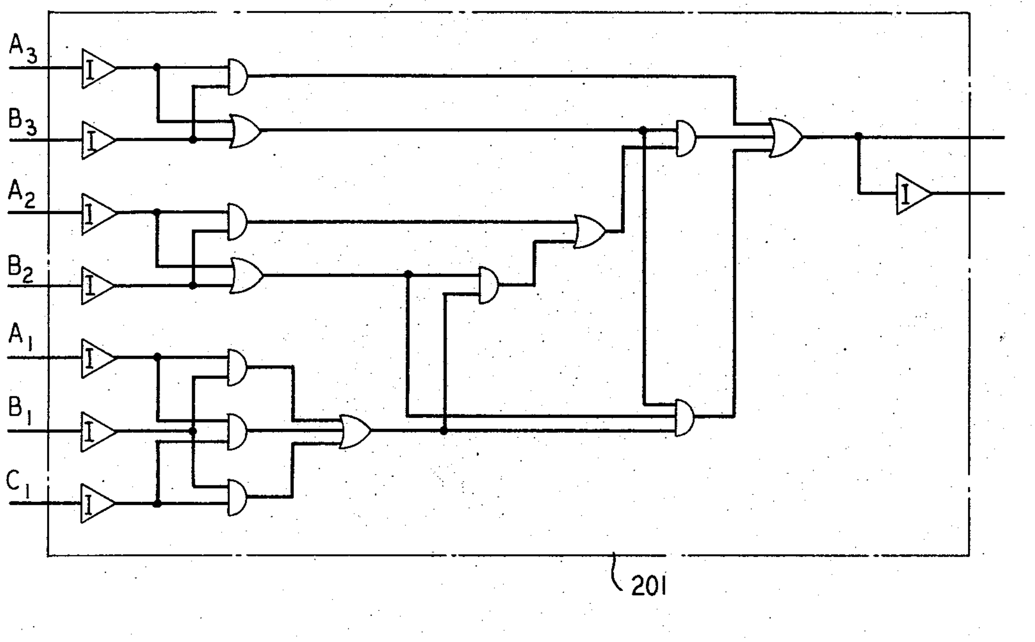

FIGS. 7 and 8 illustrate possible standard logic gate realizations for the threshold circuits 202 and 201, respectively, in FIG. 2. These realizations for circuits 201 and 202 further illustrate the potential need for appropriately "padding" of propagation delays for particular circuits if the typical relative delays described above in connection with the circuits of FIGS. 3 and 4 are not otherwise achieved. It will be noted that only standard inverters, AND gates, and OR gates are required to realize the circuits of FIGS. 7 and 8.

Though many known threshold logic circuits are readily adapted to include the generation of complements of input variables (multiplier operand bits in the present context), a simple inverter for each operand bit may be used when such complementing is not otherwise provided. Similarly, the AND functions required to generate the partial products may be realized using a simple 2-input AND gate for each required partial product when the AND function is not otherwise included in the threshold logic or other circuitry described above.

In FIG. 3, the explicit generation of the partial product has been avoided. However, it should be understood that only a simple ANDing of the operand digits $x_o$ and $y_o$ is required. Further, while the ANDing of input variables (or their complements) may be accomplished in any standard manner, it provides especially convenient in some embodiments of the present invention to instead perform equivalent NOR operations in accordance with $$\overline{\bar{x}_i V \bar{y}_j} = x_i y_j$$

This function is readily incorporated in threshold logic circuits and other circuits indicated above.

What is claimed is:

1. Apparatus for forming the product, $\vec{P}=(p_{n+m-1}, p_{m+n-2}, \ldots, p_0)$, of an $m$-bit 2's complement multiplicand, $\vec{Y}=(y_{m-1}, y_{m-2}, \ldots, y_0)$, and an $n$-bit 2's complement multiplier, $\vec{X}=(x_{n-1}, x_{n-2}, \ldots, x_0)$, comprising A. first means for forming partial product terms $x_i y_j$ for all $i$ and $j$ yielding positive values, B. second means for forming partial product terms having positive values equivalent to those $x_iy_j$ which are negative, and C. third means for combining said partial product terms formed by said first and second means to form said product $\vec{P}$.

2. Apparatus according to claim 1 wherein said first means comprises a plurality of 2-input AND gates, and means for applying one bit $x_i$ and one bit $y_j$ to each of said AND gates.

3. Apparatus according to claim 1 wherein said second means comprises 1. means for complementing each multiplicand bit $y_j$ to form a corresponding bit $\bar{y}_j$,
2. means for complementing each multiplier bit $x_i$ to form a corresponding bit $\bar{x}_1$,
3. a plurality of 2-input AND gates,
4. means for applying $x_{n-1}$ to one input of each of a first set of $m-1$ of said AND gates,
5. means for applying one of the bits $\bar{y}_j$, $j = 0,1, \ldots, m-2$ to the other input of respective ones of said m−1 AND gates in said first set of AND gates,
6. means for applying $y_{m-1}$ to one input of each of a second set of $n-1$ of said AND gates, and
7. means for applying $\bar{x}_i$, $i = 0,1, \ldots, n-2$ to the other input of respective ones of said $n-1$ AND gates in said second set of AND gates.

4. Apparatus according to claim 3 wherein said second means further comprises means for generating a partial product having the constant value 1.

5. Apparatus according to claim 1 wherein said third means comprises means for selectively adding said terms formed by said first and second means.

6. Apparatus according to claim 5 wherein said means for adding comprises an interconnected array of substantially identical adders.

7. Apparatus according to claim 6 wherein each of said substantially identical adders comprises a 3-bit adder.

8. Apparatus according to claim 6 wherein each of said adders comprises an interconnected plurality of threshold logic circuits.

9. Apparatus according to claim 8 wherein each of said adders comprises a 3-bit adder.

10. In a digital processing system, the machine method for forming the product, $\vec{P} = (p_{n+m-1}, p_{n+m-2}, \ldots, p_0)$, of an $m$-bit 2's complement multiplicand, $\vec{Y} = (y_{m-1}, y_{m-2}, \ldots, y_0)$, and an $n$-bit 2's complement multiplier, $\vec{X} = (x_{n-1}, X_{n-2}, \ldots, x_0)$ comprising the steps of A. forming partial product terms $x_iy_j$ for all $i$ and $j$ which yield positive values, B. forming positive partial product terms equivalent to those $x_iy_j$ which are negative, and C. combining said partial product terms formed at steps (A) and (B) to produce $\vec{P}$.

11. The method of claim 10 wherein said step (B) comprises 1. forming the AND of $x_{n-1}$ and $\bar{y}_j$ for $j = 0,1, \ldots, m-2$,
2. forming the AND of $y_{m-1}$ and $\bar{x}_i$ for $i = 0,1, \ldots, n-2$, and
3. forming as partial products $x_{n-1}$, $\bar{x}_{n-1}$, $y_{m-1}$, $\bar{y}_{m-1}$, and 1.

12. Apparatus for forming the product, $\vec{P} = (p_{n+m-1}, p_{n+m-2}, \ldots, p_0)$, of an $m$-bit 2's complement multiplicand, $\vec{Y} = (y_{m-1}, y_{m-2}, \ldots, y_0)$, and an $n$-bit 2's complement multiplier, $\vec{X} = (x_{n-1}, x_{n-2}, \ldots, x_0)$ comprising A. means for forming the positive partial products
$x_iy_j$, for $0 \leq i \leq n-2$;
$x_{n-1}\bar{y}_j$, for $0 \leq j \leq$ m − 2;
$\bar{x}_iy_{m-1}$, for $0 \leq i \leq n-2$;
$x_{n-1}$, $\bar{x}_{n-1}$, $y_{m-1}$, $\bar{y}_{m-1}$, 1, and $x_{n-1}y_{m-1}$, and B. means for selectively combining said partial products.

13. Apparatus according to claim 12 wherein said means for selectively combining comprises summing means for 1. forming $P_k$, $k = 0,1, \ldots, n+m-2$, by summing all of said partial products, the sum of whose subscripts is equal to $k$, and carries from the sum for $k-1$, and
2. forming $p_{m+n-1}$ by adding 1 to the carry resulting from the summing for $k = n+m-2$.

14. Apparatus according to claim 13 wherein said summing means comprises an array of substantially identical adders.

* * * * *